US007702709B2

(12) United States Patent
Duan

(10) Patent No.: US 7,702,709 B2
(45) Date of Patent: Apr. 20, 2010

(54) SYSTEM AND METHOD FOR OPTIMIZING APPROXIMATION FUNCTIONS

(75) Inventor: Ji-Ning Duan, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 695 days.

(21) Appl. No.: 10/177,290

(22) Filed: Jun. 21, 2002

(65) Prior Publication Data

US 2003/0236675 A1 Dec. 25, 2003

(51) Int. Cl.
*G06F 7/38* (2006.01)
*G06F 15/00* (2006.01)

(52) U.S. Cl. ...................................... 708/290; 708/200

(58) Field of Classification Search ......... 708/270–277, 708/290, 200, 446, 490
See application file for complete search history.

(56) References Cited

U.S. PATENT DOCUMENTS

| 5,042,001 | A | * | 8/1991 | Brightman et al. | 708/490 |
|---|---|---|---|---|---|
| 5,068,816 | A | * | 11/1991 | Noetzel | 708/270 |
| 5,808,574 | A | * | 9/1998 | Johnson et al. | 708/313 |
| 5,951,629 | A | * | 9/1999 | Wertheim et al. | 708/517 |
| 6,124,542 | A | * | 9/2000 | Wang | 84/605 |
| 6,363,405 | B1 | * | 3/2002 | Loginov | 708/270 |
| 6,457,032 | B1 | * | 9/2002 | Silver | 708/315 |
| 6,701,028 | B1 | * | 3/2004 | Crandall | 708/420 |
| 2003/0037080 | A1 | * | 2/2003 | Clifton | 708/270 |

OTHER PUBLICATIONS

Laurent et al., Robust least squares and applications, 1996, IEEE, pp. 249-254.*
Michael et al., On the approximation power of convolution-based least squares versus interpolation, 1997, IEEE transactions on signal processing, vol. 45, No. 7, pp. 1697-1711.*
Davide et al., High-performance direct digital frequency synthesizers using piecewise-polynomial approximation, 2005, IEEE transactions on circuits and systems-I: regular papers, vol. 52, No. 2, pp. 324-337.*
Vladimir Mesarović, N.D. Hemkumar, Miroslav Dokic, "MPEG-4 AAC Audio Decoding on a 24-bit Fixed-point Dual-DSP Architecture," ISCAS 2000—IEEE International Symposium on Circuits and Systems, May 28-31, 2000, Geneva Switzerland.

* cited by examiner

*Primary Examiner*—Chat C Do
(74) *Attorney, Agent, or Firm*—McAndrews, Held & Malloy, Ltd.

(57) ABSTRACT

Systems and methods that optimize approximation functions are provided. In one example, a method that approximates a particular expression over a sample space of input values is provided. The method may include the steps of splitting the sample space of the input values into sub-regions; associating a polynomial function for each of the sub-regions; optimizing each polynomial function over the respective sub-region; and optimizing all polynomial functions over the sample space.

30 Claims, 8 Drawing Sheets

SYSTEM AND METHOD FOR OPTIMIZING APPROXIMATION FUNCTIONS

BACKGROUND OF THE INVENTION

The approximation of expressions finds use in many fields of study and in diverse applications. For example, in Moving Picture Experts Group (MPEG) advanced audio coding (AAC) or layer 3 (MP3) audio decoders, a common process is inverse quantization. The AAC and the MP3 audio decoders perform an inverse non-uniform quantization for the spectral data after a Huffman decoding:

$$x_{inq} = \text{sign}(x) \cdot |x|^{4/3}$$

where $x_{inq}$ is the output of the inverse quantization and $|x|$ is the input spectral data, ranging from 0 to 8191.

In one conventional system, a lookup table in the form of an 8k-word memory is employed such that, in this example, all 8192 possible values of $|x|$ are matched with respective values of $x_{inq}$. In many applications, an 8k-word memory takes up too much space in the chip.

On the other hand, in another conventional system, calculating $x_{inq}$ for each $|x|$ in real (i.e., on the fly) by calculating the exponential function $|x|^{4/3}$ requires an enormous amount of processing power.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Aspects of the present invention may be found in, for example, systems and methods that provide approximating functions. In one embodiment, the present invention may provide a method that approximates a particular expression. The method may include the steps of using a polynomial function to approximate the particular expression over a sample space of input values; and determining coefficients of the polynomial function that minimize an approximation error function including the polynomial function and the particular expression over the sample space of the input values.

In another embodiment, the present invention may provide a method that approximates a particular expression over a sample space of input values. The method may include the steps of splitting the sample space of the input values into sub-regions including a first sub-region and a second sub-region; associating a first polynomial function with the first sub-region; associating a second polynomial function with the second sub-region; determining coefficients of the first polynomial function that minimize an approximation error function including the first polynomial function and the particular expression over input values of the first sub-region; and determining coefficients of the second polynomial function that minimize an approximation error function including the second polynomial function and the particular expression over input values of the second sub-region.

In yet another embodiment, the present invention may provide a method that approximates a particular expression over a sample space of input values. The method may include the steps of splitting the sample space of the input values into sub-regions; associating a polynomial function for each of the sub-regions; determining coefficients of a respective polynomial function that minimize a respective approximation error function including the respective polynomial function and the particular expression over input values of the respective sub-region; and if a particular error criteria is not met, then adjusting sub-region sizes.

In yet still another embodiment, the present invention may provide a method that approximates a particular expression over a sample space of input values. The method may include the steps of splitting the sample space of the input values into sub-regions; associating a polynomial function for each of the sub-regions; optimizing each polynomial function over the respective sub-region; and optimizing all polynomial functions over the sample space.

These and other features and advantages of the present invention may be appreciated from a review of the following detailed description of the present invention, along with the accompanying figures in which like reference numerals refer to like parts throughout.

DETAILED DESCRIPTION OF THE INVENTION

Although reference may, at times, be made to a particular example of an inverse quantization for spectral data after Huffman decoding, the present invention need not be so limited. The present invention may, for example, be applied to any expression in any field or application that may be, at least in part, approximated.

In one example, the present invention may provide a polynomial curve fitting function that may be used in approximating the expression for $x_{inq}$. Thus, for example, $$x^{4/3} \approx F(x) = a_N x^N + a_{N-1} x^{N-1} + \ldots + a_1 x + a_0$$

where $F(x)$ is an N-th order polynomial function. The present invention is not specifically limited to polynomial functions, but may use other approximating functions or algorithms including conventional approximating functions or algorithms not further detailed herein, but known to one of ordinary skill in the art.

Whether F(x) is a good approximation for $X^{4/3}$ may be determined by any number of ways including using conventional methods known to one of ordinary skill in the art. In one example, for a particular order N, F(x) may be a good approximation when the least square function $L(x_n)$ is minimized where $$L(x_n) = \sum_{n=1}^{T} [F(x_n) - y_n]^2$$

and where T is the total number of sample inputs (e.g., 8192), $x_n$ is the n-th sample input value, and $y_n$ includes the ideal value of, for example, of $X_n^{4/3}$. Thus, the coefficients of the polynomial function may be selected such that the least square expression is minimized. Then, the optimized coefficients may be stored and $F(x_n)$ may be used as a good approximation for $x_n^{4/3}$.

In calculating F(x) and thus approximating, in one example, $x^{4/3}$, the polynomial function can be rearranged as shown:

$$F(x)=((\ldots(a_N x+a_{N-1})x+\ldots)x+a_1)x+a_0$$

which uses, for example, N multiply-and-add computations. Other methods for calculating the polynomial function are also contemplated by the present invention.

Figure 1A:
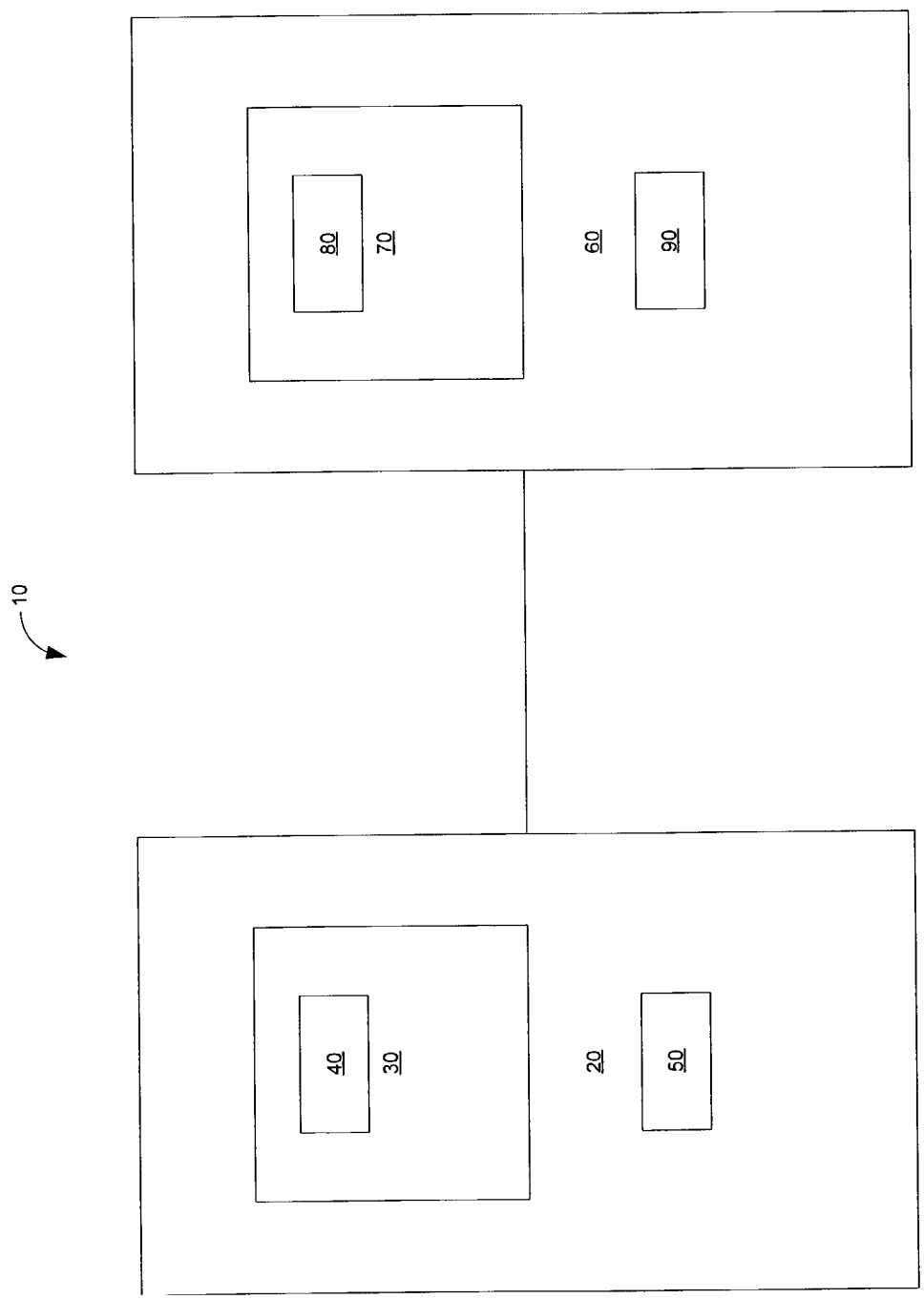
FIG. 1A shows a block representation illustrating an example of a system that provides a polynomial function that approximates a particular expression according to the present invention.

FIG. 1A shows a block representation illustrating an example of a system that provides a polynomial function that approximates a particular expression according to the present invention. The system 10 may be used, for example, with any of the examples of processes described herein according to the present invention. The present invention may also contemplate other systems and their equivalents being used with any of the examples of the processes described herein. The system 10 may include a computing device 20 detachably coupled to a target device 60. The computing device 20 may be a computer or other such computing device and may include a processor 30 (e.g., an offline processor). The processor 30 may include a memory 40 and/or may be coupled to a memory 50. The target device 60 may be, for example, a microprocessor, a programmable memory, a decoder, a controller, etc. and may include a processor 70. The processor 70 may include a memory 80 and/or may be coupled to a memory 90.

Figure 1B:
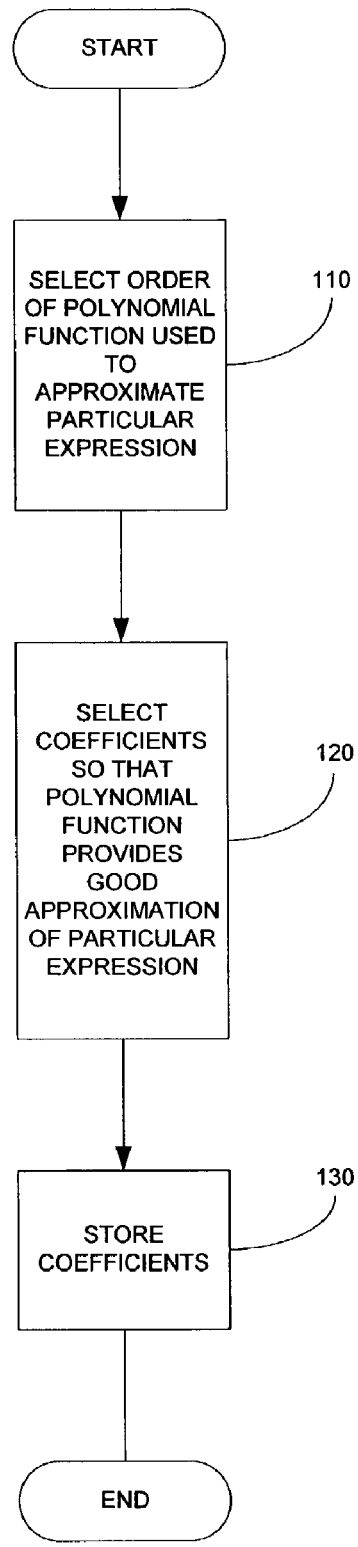
FIG. 1B shows a flowchart illustrating an example of a process that provides a polynomial function that approximates a particular expression according to the present invention.

FIG. 1B shows a flowchart illustrating an example of a process that provides a polynomial function that approximates a particular expression according to the present invention. In step 110, an order (e.g., N) of a polynomial function (e.g., F(x)) is selected in which the polynomial function may provide an approximation to the particular expression (e.g., $x^{4/3}$). In one example, the processor 30 of the computing device 20 (e.g., a computer) may select the order of the polynomial function and then may store the value in at least one of the memories 40, 50. In step 120, coefficients (e.g., $a_0$ to $a_N$) of the polynomial function are selected to provide a good approximation to the particular expression. In one example, the processor 30 of the computing device 20 may determine the optimized coefficients of the polynomial function. The coefficients may be stored in at least one of the memories 40, 50. In step 130, the coefficients are stored. In one example, the processor 30 may then store the coefficients into, for example, at least one of the memories 80, 90 that is to be or that has been installed (e.g., integrated) into the target device 60. Once the coefficients have been stored in at least one of the memories 80, 90, then the memories 80, 90 and/or the target device 60 may be detached from the computing device 20.

The target device 60 may employ, for example, a less powerful processor 70 that can perform, for example, the N multiply-and-add computations. In addition, the coefficients take up much less memory space and physical space than the conventional 8k-word memory. In one example, the N+1 coefficients of the polynomial function F(x) may be stored in at least one of the target device memories 80, 90. Then the N+1 coefficients and a particular input value $x_n$ may be used to calculate an approximation of $X_n^{4/3}$. Such a process may be performed for any of, for example, the 8192 input values. In one example, the output of the polynomial function has been optimized in a least square sense.

In another example, the present invention may provide an approximation for an expression such as, for example, $x_n^{4/3}$, by splitting the sample space into m sub-regions in which a polynomial function $F_j(x)$ corresponding to a respective sub-region j is optimized in a least square sense over the respective sub-region j where j is a number ranging from 1 to m. Each of the m polynomial functions may be optimized.

Figure 2:
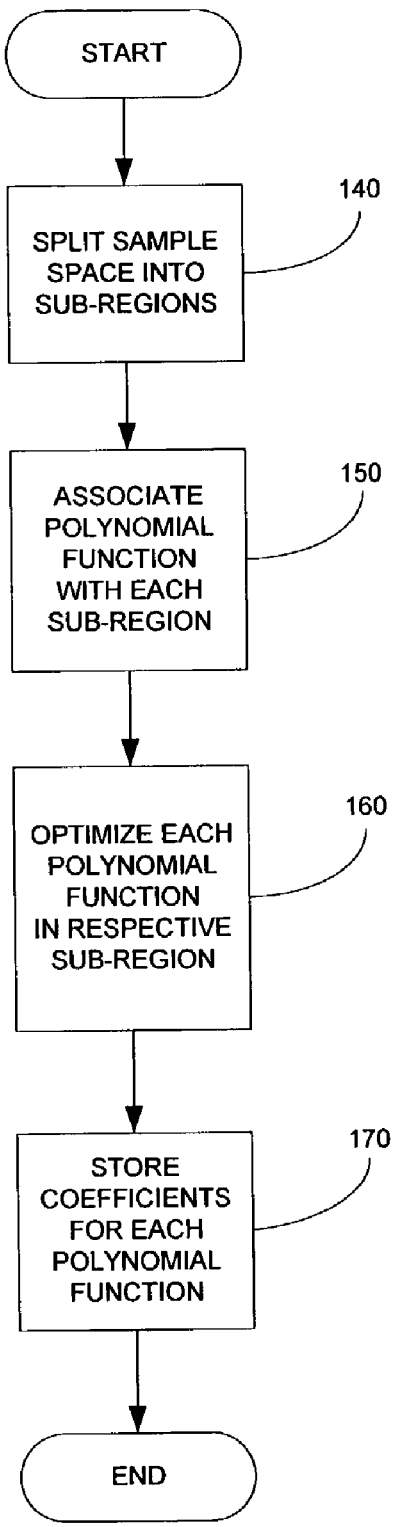
FIG. 2 shows a flowchart illustrating an example of a process that provides a piecewise polynomial function that approximates a particular expression according to the present invention.

FIG. 2 shows a flowchart illustrating an example of a process that provides a piecewise polynomial function that approximates a particular expression according to the present invention. In step 140, the entire sample space is split into sub-regions. The number of sub-regions can be preset or may be determined in light of, for example, memory or resolution considerations. In one example, the sample space may be split into approximately equal sub-regions or the sample space may be split into approximately unequal sub-regions. For example, the sub-regions may get larger as the sample inputs get larger.

In step 150, a polynomial function is associated with each of the sub-regions. The order of the polynomials may be preset or determined in light of, for example, resolution or error considerations. Since the sub-regions are smaller than the entire sample space, the order of the polynomial functions may be smaller than the order of the above-described polynomial function that covered the entire sample space to achieve a possibly approximately same degree of accuracy. The polynomial functions may also have the same order as the above-described polynomial function that covered the entire sample space to achieve a possibly approximately higher degree of accuracy or resolution. In one example, all the polynomial functions have the same order. In another example, at least one of the polynomial functions has an order different from at least one other polynomial function.

Figure 5:
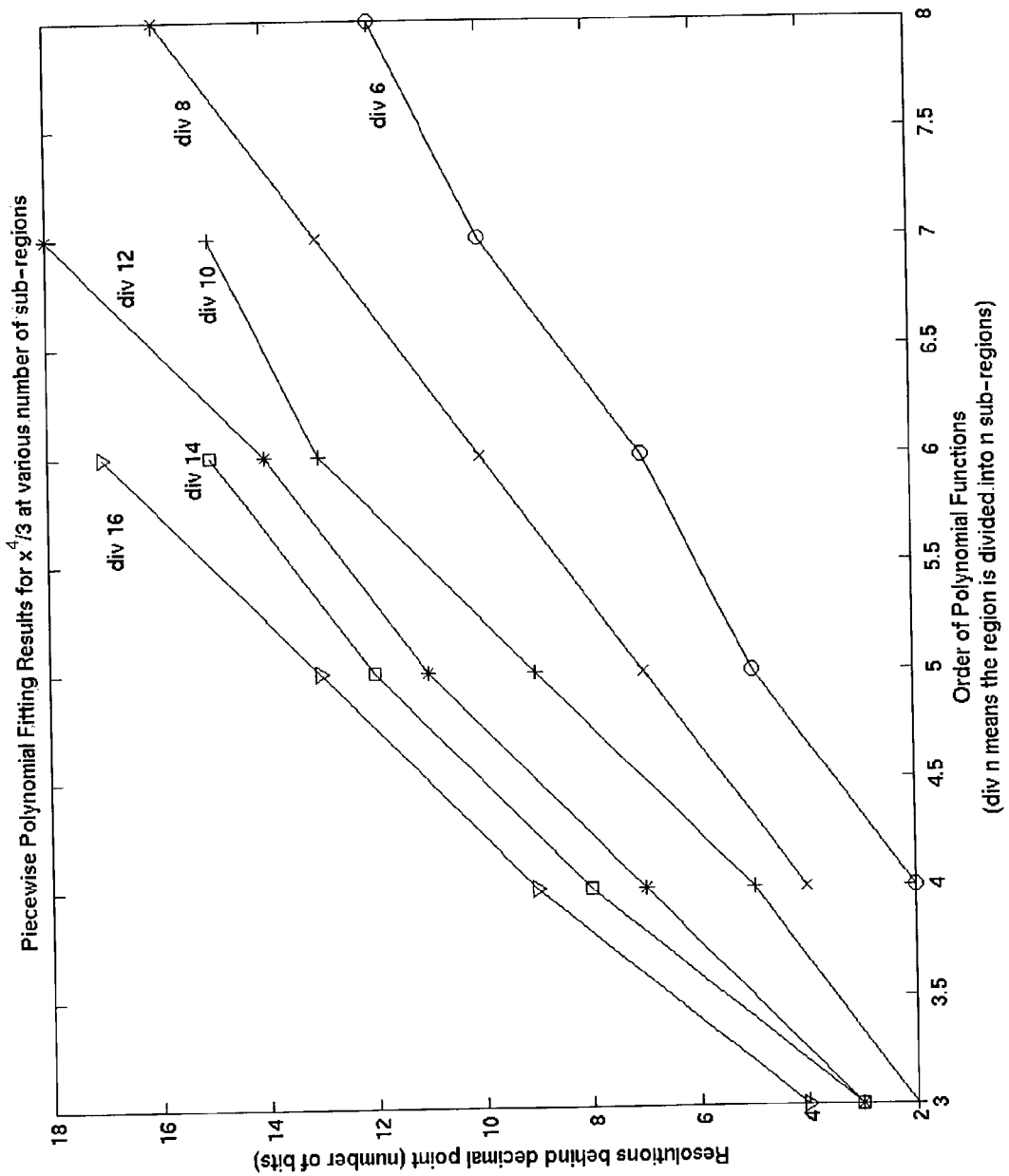
FIG. 5 shows a plot illustrating an example of piecewise polynomial fitting results according to the present invention.

FIG. 5 shows a plot illustrating an example of piecewise polynomial fitting results according to the present invention. The plot shows the interrelationship of at least three variables: number of sub-regions, order of polynomial functions and resolution behind decimal point. From the plot, in this example, it is shown that, for a particular order of polynomial functions, as the number of sub-regions increases, the resolution also increases. In this example, it is shown that, for a particular number of sub-regions, as the order of the polynomials increases, the resolution also increases.

Referring again to FIG. 2, in step 160, each polynomial function is optimized to better approximate the particular expression in the respective sub-region. In one example, coefficients for each polynomial function are selected to minimize a least square function over at least the samples in the respective sub-region. However, the present invention may contemplate using other optimization techniques including conventional optimization techniques. In step 170, the coefficients for each optimized polynomial function from respective sub-regions are stored. In one example, the coefficients may be stored into the target device 60 which may be detachably coupled to an offline processor 30. The offline processor 30 may, in one example, perform one or more of the steps described in steps 140-170. Accordingly, the target device 60 may employ a less powerful processor 70 to calculate outputs of the appropriate optimized polynomial function to approximate the output of the particular expression.

In yet another example, the present invention may not only split the entire sample space into sub-regions, optimize each polynomial function corresponding to the respective sub-region, but also optimize the polynomial functions over the entire sample space.

Figure 3:
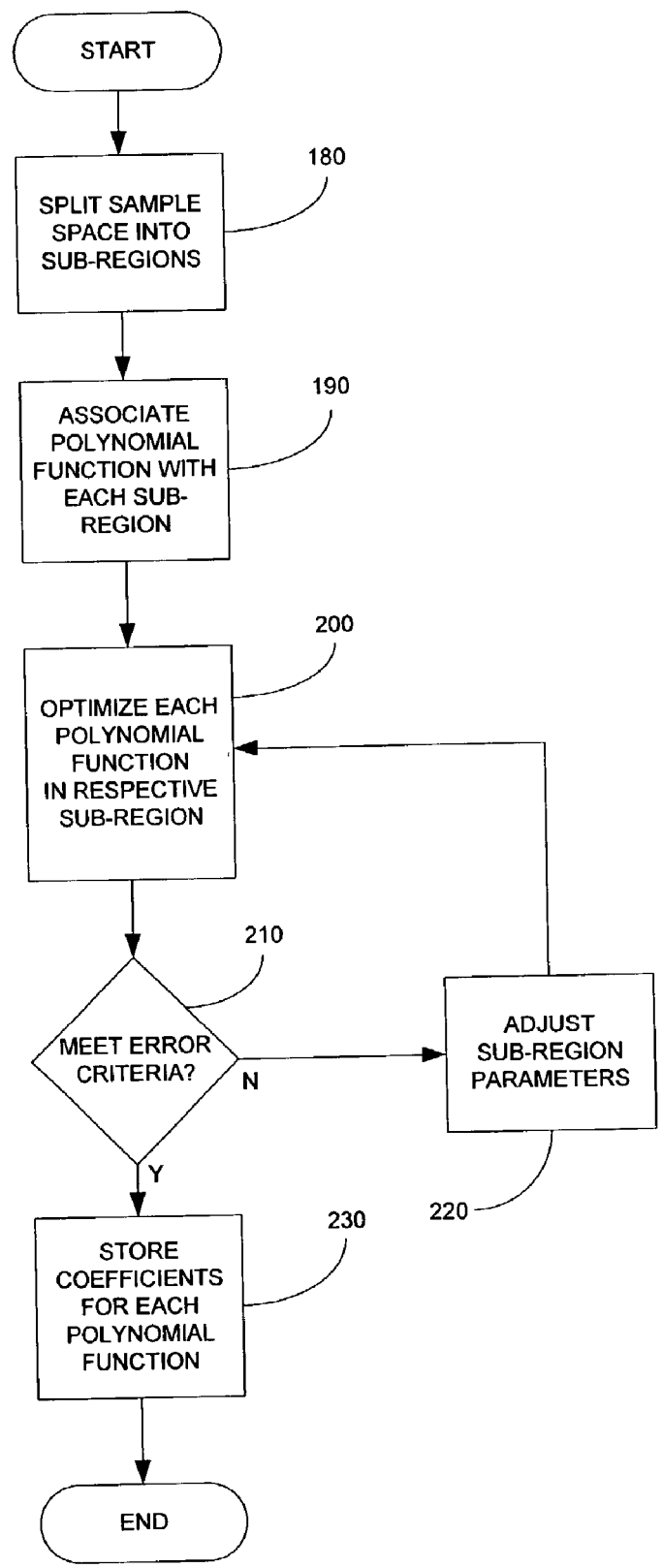
FIG. 3 shows a flowchart illustrating an example of a process that provides a piecewise polynomial function that approximates a particular expression according to the present invention.

FIG. 3 shows a flowchart illustrating an example of a process that provides a piecewise polynomial function that approximates a particular expression according to the present invention. In step 180, the entire sample space is split into sub-regions. In step 190, a polynomial function is associated with each of the sub-regions. In step 200, each polynomial function is optimized to better approximate the particular expression in the respective sub-region. Steps 180-200 are similar to the above-described steps 140-160 and are not further described.

In query 210, it is determined whether a particular error criteria is met. In one example, a maximal absolute error (MAE) is defined for each optimized sub-region. An error at a particular input sample value (i.e., $e(x_n)$) may be, for example, the difference between the appropriate polynomial function output for the particular input sample value and the expression output for the particular input sample value; which can be expressed as $$e(x_n)=F_j(x_n)-y_n.$$

The MAE for a particular sub-region is, for example, the absolute value of the largest error in the particular sub-region.

Figure 4:
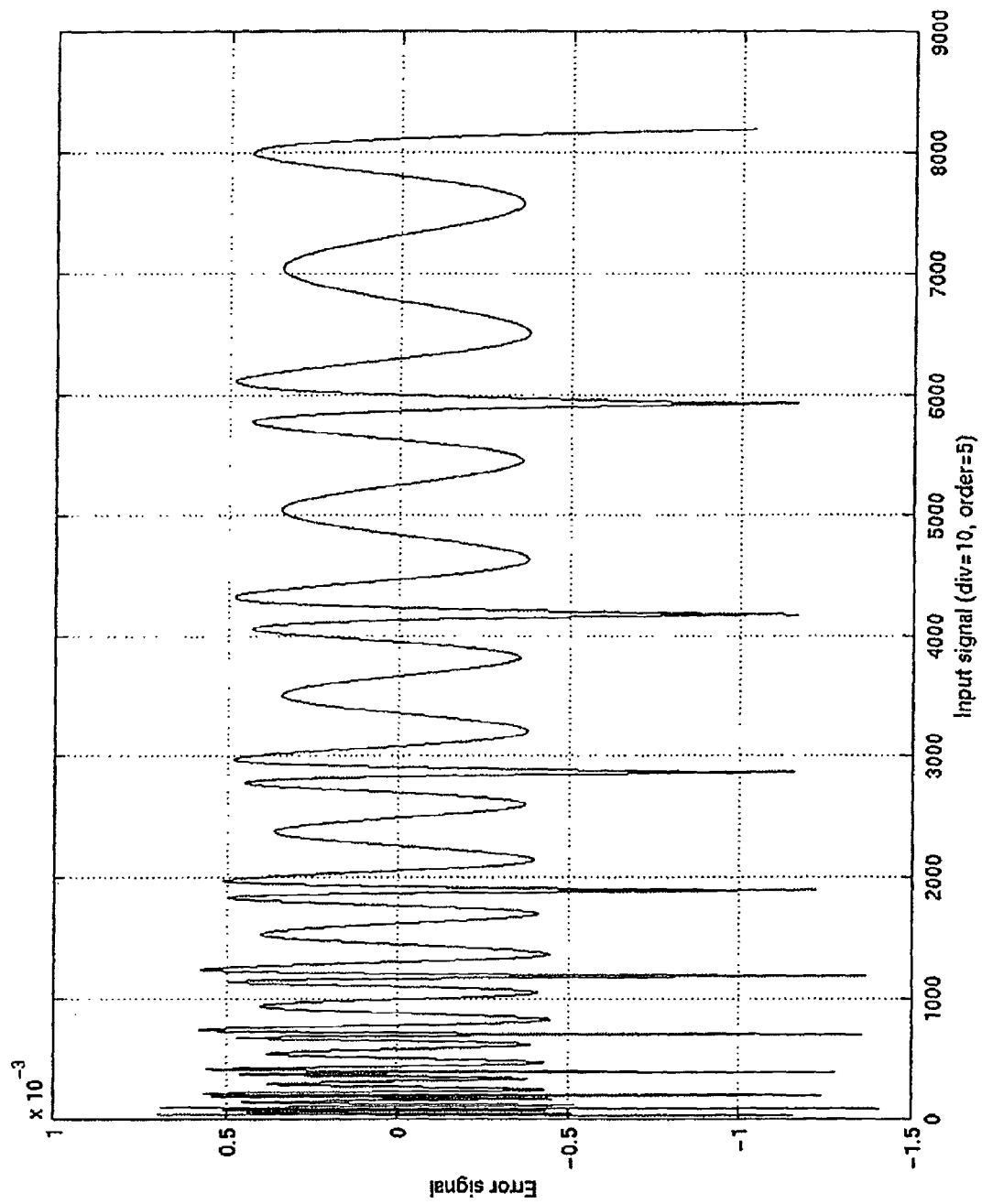
FIG. 4 shows a graph illustrating an example of an error signal as a function of input values according to the present invention.

FIG. 4 shows a graph illustrating an example of an error signal as a function of input values according to the present invention. The plot shows an example in which a fifth order polynomial is used in each of the ten sub-regions. The plot also shows in some cases that the MAE of a particular sub-region is at or near a boundary of the sub-region. Accordingly, the plot also illustrates sub-regions having different numbers of input values. In this illustrated example, the sub-regions are generally increasing in size as the input signal increases in value.

One example of an error criteria is whether all of the MAEs are below an absolute or relative MAE threshold. Another example of an error criteria is whether the MAEs all fall within an absolute or relative range. The range may be defined, for example, as between a first percentage and a second percentage of a particular MAE (e.g., the largest MAE of all the MAEs, the smallest MAE of all the MAEs or another MAE). The range may be defined, for example, as between a first percentage of a first MAE and a second percentage of a second MAE. The range may also be defined, for example, as some combination of absolute and relative components.

However, the present invention also may contemplate using other figures of merit besides or in combination with the MAE. For example, a figure of merit that may be used in determining whether an error criteria has been met is the least square error. The least square error may be calculated for each sub-region or may be summed across the entire sample space for a total least square error. Thus, error criteria may include absolute or relative ranges or thresholds related to the concept of a least square error or a total least square error.

If the error criteria of query 210 is met, then the polynomial functions have been optimized not only within each sub-region, but also across the entire sample space. In step 230, the coefficients of each polynomial function is stored. In one example, the size of the memory that may be used to store the polynomial coefficients is given by $$size=(N+1)\cdot L$$

where N is the order of the polynomial functions and L is the number of sub-region divisions.

If the error criteria of query 210 is not met, then the sub-region parameters are adjusted. For example, some sub-regions may be made larger and some sub-regions may be made smaller. In another example, some sub-regions may be expanded to include more input data samples and some sub-regions may be contracted to include fewer input data samples. For example, if a sub-region has a particularly high MAE, then it may reduce the number of input sample values. If a sub-region has a particularly low MAE, then it may increase the number of input sample values. The expansion of one sub-region may be at the expense of at least one other sub-region. Thus, for example, the sub-region with the highest or one of the highest MAE may decrease the number of sample input values in its sub-region by K sample input values; the sub-region with the lowest or one of the lowest MAE may increase the number of sample input values in its sub-region by K sample input values. One or more sub-regions may increase the number of sample input values in the respective sub-regions and one or more sub-regions may decrease the number of sample input values in the respective sub-regions. The present invention also may contemplate adjusting other sub-region parameters of the sub-region to reduce or to increase the MAE of particular sub-regions.

After the sub-region parameters have been adjusted, each polynomial function in a respective sub-region is optimized in step 200. The coefficients of the polynomial function may be different from the first optimization. In query 210, it is determined whether or not the error criteria has now been met. If not, then the loop including step 220, step 200 and query 210 repeats itself until the error criteria has been met or the number of times through the loop exceeds a preset threshold (e.g., 1000 times). When the error criteria has been met, then the process continues as described above at step 230.

Figure 6:
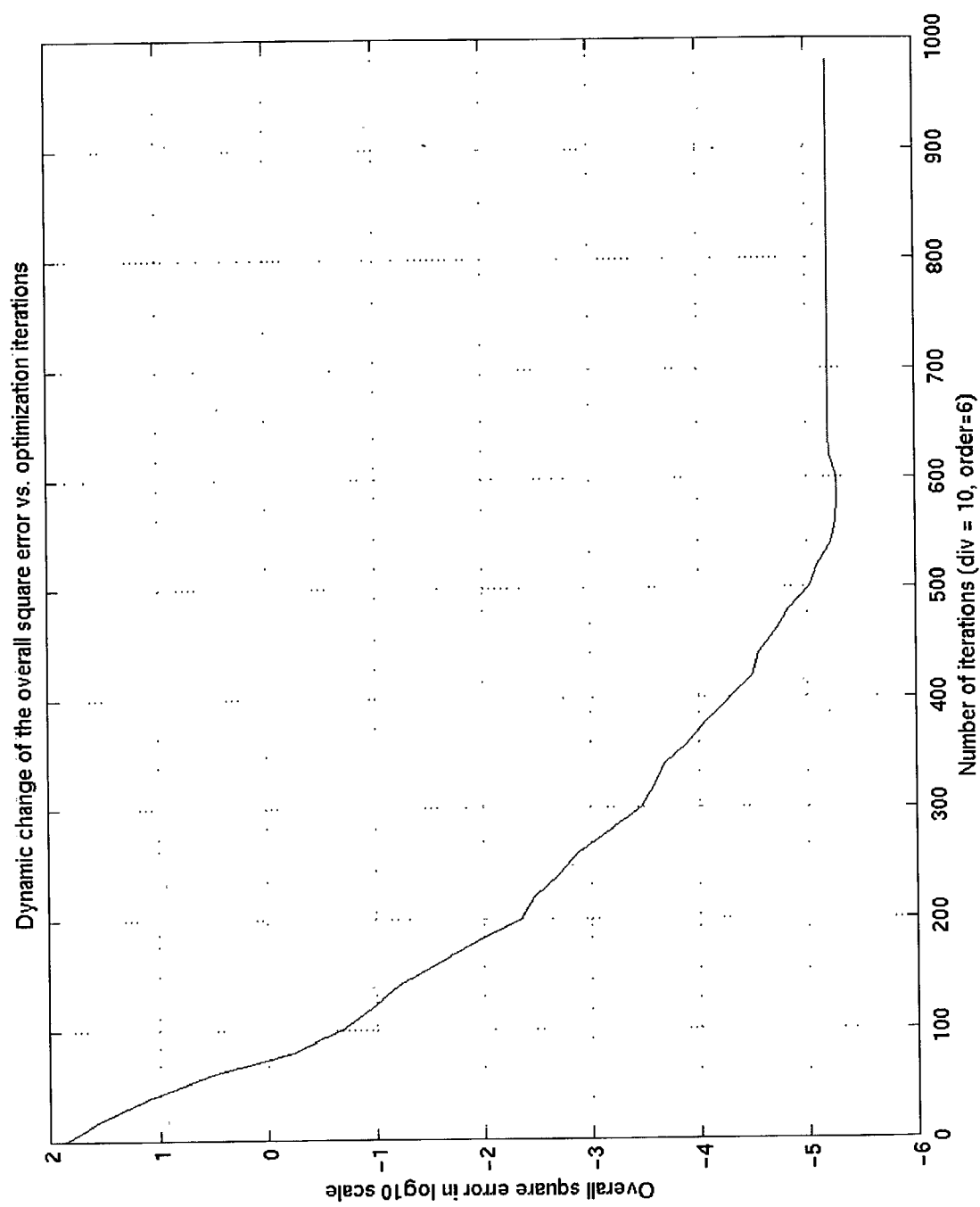
FIG. 6 shows a plot illustrating an example of a dynamic change of an overall square error according to the present invention.
Figure 7:
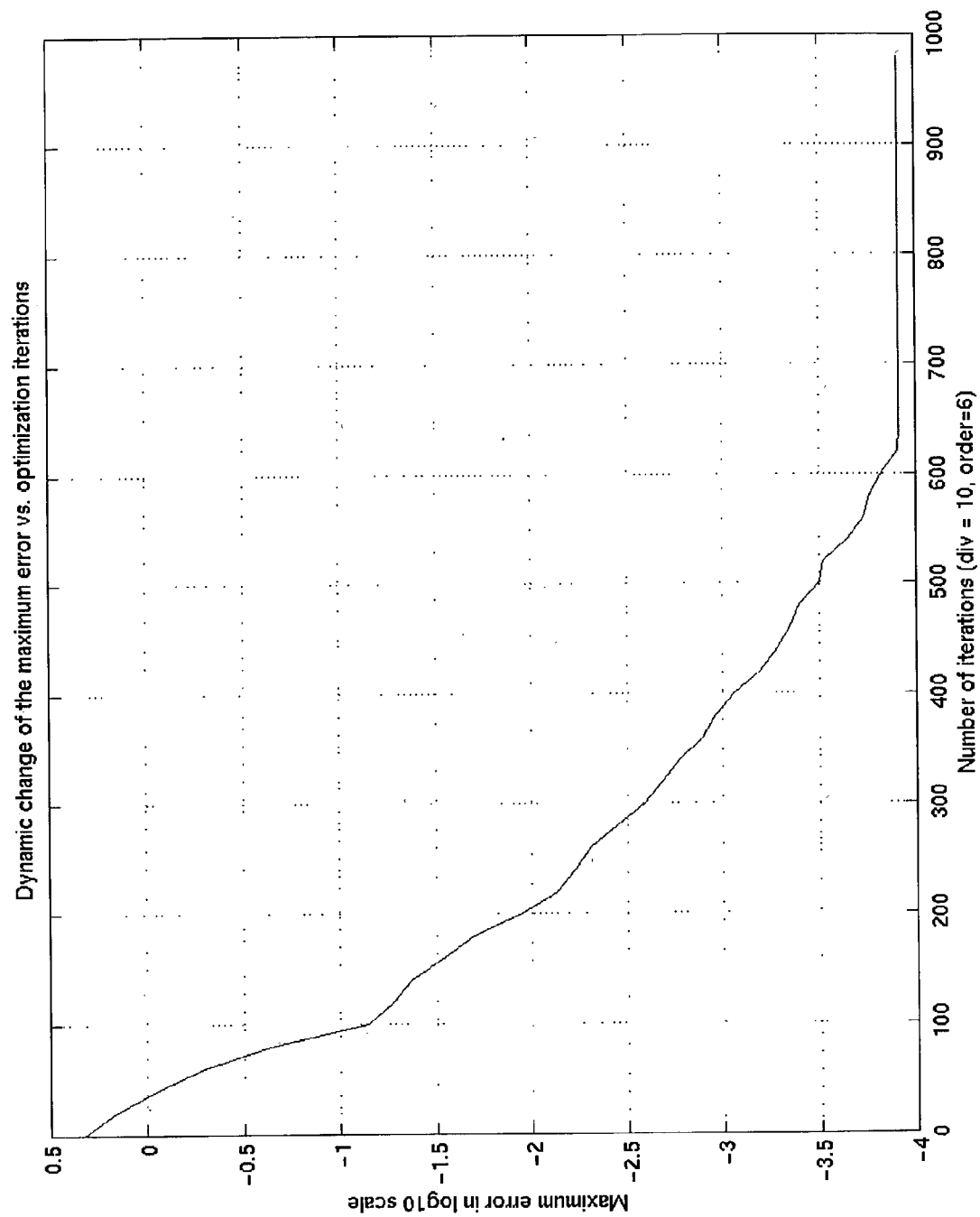
FIG. 7 shows a plot illustrating an example of a dynamic change of a maximum error according to the present invention.

FIG. 6 and FIG. 7 show plots illustrating an example of the dynamic change of the overall square error and the maximum error, respectively, according to the present invention. In this example, a sixth order polynomial function is used in each of the ten sub-regions. The dynamic change is measured as a function of the number of iterations (i.e., the number of times the process goes through the loop described above). FIGS. 6 and 7 show that the error may decrease as the number of iterations increases for a first portion of the plots. Then, the error may level off after the number of iterations reaches a certain value in a second portion of the plots.

The present invention also may contemplate other embodiments to the systems and methods that provide an optimized approximating function. For example, of the entire sample space, a portion or portions of the sample space may have at least one dedicated lookup table. In one example, sample input values $x_1$ to $x_{32}$ may be stored in a lookup table with output values $y_1$ to $y_{32}$. The rest of the sample space may be covered by an optimized piecewise polynomial approximation as described above.

In another example, floating point representation or fixed point representation may be used according to the present invention. In one example, fixed point representations of the input value and the coefficients may be used in the optimization loop, which may potentially provide better overall performance than that of, for example, a floating point representation followed by a fixed point conversion.

In yet another example, to possibly soften MAE occurring near boundaries of sub-regions, the present invention may contemplate, for optimizing each of the polynomial functions, temporarily expanding the sub-region boundaries such that the boundaries overlap. Thus, some sample input values may be shared by overlapping sub-regions and thus used in more than one process for optimizing polynomial functions. This overlapping of boundaries may or may not apply when determining, for example, the MAE. Thus, in one example, the calculation of the MAE for a sub-region may be determined using the previous non-overlapping sub-regions.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. In a computing device, a method for configuring a decoder, the method comprising:
   performing, by a computing device, at least the steps of:
   splitting a sample space of input values into sub-regions comprising a first sub-region and a second sub-region;
   associating a first polynomial function with the first sub-region and a second polynomial function with the second sub-region, wherein the first sub-region and the second sub-region are of unequal size;
   determining coefficients of the first polynomial function that minimize an approximation error function comprising the first polynomial function and a particular decoding expression over input values of the first sub-region;
   determining coefficients of the second polynomial function that minimize an approximation error function comprising the second polynomial function and the particular decoding expression over input values of the second sub-region; and
   configuring a decoder by, at least in part, storing the coefficients in a memory associated with the decoder;
   wherein the stored coefficients are utilized by the decoder during operation of the decoder to decode audio and/or video information while the computing device and the decoder have been communicatively decoupled.

2. The method according to claim 1, wherein determining coefficients of the first polynomial function and determining coefficients of the second polynomial are performed offline by the computing device.

3. The method according to claim 1, wherein the decoder has less processing power than the computing device.

4. The method according to claim 1, wherein the approximation error function comprises a least square error function.

5. The method of claim 1, wherein the particular decoding expression is an inverse quantization expression.

6. The method of claim 1, wherein the decoder comprises a processor and the memory.

7. The method of claim 6, wherein the processor comprises the memory.

8. The method according to claim 1, comprising storing the coefficients in a memory associated with the computing device, wherein the computing device memory and the decoder memory are discrete components.

9. In a computing device, a method for configuring a decoder, the method comprising:
   performing, by a computing device, at least the steps of:
   splitting a sample space of input values into sub-regions comprising a first sub-region and a second sub-region;
   associating a first polynomial function with the first sub-region and a second polynomial function with the second sub-region, wherein the first polynomial function and the second polynomial function are of different respective orders;
   determining coefficients of the first polynomial function that minimize an approximation error function comprising the first polynomial function and a particular decoding expression over input values of the first sub-region;
   determining coefficients of the second polynomial function that minimize an approximation error function comprising the second polynomial function and the particular decoding expression over input values of the second sub-region; and
   configuring a decoder by, at least in part, storing the coefficients of the first and second polynomial functions in a memory associated with the decoder;
   wherein the stored coefficients are utilized by the decoder during operation of the decoder to decode audio and/or video information while the computing device and the decoder have been communicatively decoupled.

10. The method according to claim 9, wherein splitting the sample space of input values into sub-regions comprises splitting the sample space of input values into at least three sub-regions.

11. The method according to claim 9, wherein determining coefficients of the first polynomial and determining coefficients of the second polynomial are performed offline by the computing device.

12. The method according to claim 9, wherein the computing device is detachably coupled to the decoder.

13. The method of claim 9, wherein the first and second sub-regions are of different respective sizes.

14. The method of claim 9, wherein the first and second sub-regions overlap.

15. The method according to claim 9, comprising storing the coefficients in a memory associated with the computing device, wherein the computing device memory and the decoder memory are discrete components.

16. In a computing device, a method for configuring a decoder for approximating a particular decoding expression over a sample space of input values, the method comprising:
   performing, by a computing device, at least the steps of:
   (a) splitting the sample space of input values into sub-regions;
   (b) associating a polynomial function with each of the sub-regions, wherein one or both of:
      the sub-regions are of unequal size, and/or
      the polynomial function associated with each of the sub-regions is of different respective orders;
   (c) determining coefficients of a respective polynomial function that minimize a respective approximation error function comprising the respective polynomial function and the particular decoding expression over input values of a respective sub-region;

(d) if a particular error criteria is not met, then (1) adjusting sub-region sizes by reducing the size of a sub-region with a relatively high error metric and enlarging the size of a sub-region with a relatively low error metric, and (2) determining the coefficients of the respective polynomial function that minimize the respective approximation error function comprising the respective polynomial function and the particular decoding expression over the input values of the respective sub-region; and (e) configuring a decoder by, at least in part, storing the coefficients in a memory associated with the decoder, where the stored coefficients are utilized by the decoder during operation of the decoder to decode audio and/or video information.

17. The method according to claim 16, wherein steps (d)(1) and (d)(2) are repeated until the error criteria is met.

18. The method according to claim 16, wherein the error criteria is related to a maximum absolute error (MAE).

19. The method according to claim 16, wherein the error criteria is related to a least square error.

20. The method according to claim 16, wherein at least one of steps (a)-(e) is performed by an offline processor.

21. The method according to claim 16, wherein the computing device is detachably coupled to the decoder.

22. The method according to claim 16, wherein:
the sample space of input values is part of a larger sample space of input values; and
the larger sample space of input values comprises first input values that are associated with approximation output values stored in a dedicated lookup table and second input values that are associated with approximation output values determined by polynomial approximation and not stored in the dedicated lookup table.

23. The method according to claim 16, comprising storing the coefficients in a memory associated with the computing device, wherein the computing device memory and the decoder memory are discrete components.

24. A decoder, the decoder comprising:
a memory configured to comprise:
first stored coefficients of a first polynomial function associated with a first sub-region, the first stored coefficients determined to minimize an approximation error function comprising the first polynomial function and a particular decoding expression over input values of the first sub-region;
second stored coefficients of a second polynomial function associated with the second sub-region, the second stored coefficients determined to minimize an approximation error function comprising the second polynomial function and the particular decoding expression over input values of the second sub-region;
wherein the first sub-region and the second sub-region are of unequal size; and
wherein the stored coefficients were determined by, at least in part:
adjusting respective sizes of the first sub-region and the second sub-region by reducing a size of a sub-region with a relatively high error metric and enlarging a size of a sub-region with a relatively low error metric,
determining first coefficients that minimized a first approximation error function comprising the first polynomial function and the particular decoding expression over input values of the first sub-region; and
determining second coefficients that minimized a second approximation error function comprising the second polynomial function and the particular decoding expression over input values of the second sub-region; and
circuitry, communicatively coupled to the memory, that operates to utilize the stored coefficients to approximate the particular decoding expression to decode audio and/or video information.

25. A decoder configured to approximate a particular decoding expression over a sample space of input values, the sample space of input values split into sub-regions comprising a first sub-region and a second sub-region, the decoder comprising:
a memory configured to comprise:
first stored coefficients of a first polynomial function associated with the first sub-region, the first stored coefficients determined to minimize an approximation error function comprising the first polynomial function and the particular decoding expression over input values of the first sub-region;
second stored coefficients of a second polynomial function associated with the second sub-region, the second stored coefficients determined to minimize an approximation error function comprising the second polynomial function and the particular decoding expression over input values of the second sub-region;
wherein the first polynomial function and the second polynomial function are of different respective orders; and
wherein the stored coefficients were determined by, at least in part:
adjusting respective sizes of the first sub-region and the second sub-region by reducing a size of a sub-region with a relatively high error metric and enlarging a size of a sub-region with a relatively low error metric,
determining first coefficients that minimized a first approximation error function comprising the first polynomial function and the particular decoding expression over input values of the first sub-region; and
determining second coefficients that minimized a second approximation error function comprising the second polynomial function and the particular decoding expression over input values of the second sub-region; and
circuitry, communicatively coupled to the memory, that operates to utilize the stored coefficients to approximate the particular decoding expression to decode audio and/or video information.

26. The decoder of claim 25, wherein the first sub-region and the second sub-region are of different respective sizes.

27. The decoder of claim 25, wherein the first sub-region and the second sub-region overlapped during the determination of the stored coefficients.

28. The decoder of claim 25, wherein the stored coefficients were determined by, at least in part, repeating the adjusting respective sizes step, determining first coefficients step and determining second coefficients step until a particular error criterion was met.

29. The decoder of claim 28, wherein the particular error criterion was related to a maximum absolute error (MAE).

30. The decoder of claim 25, wherein:

the sample space of input values is part of a larger sample space of input values; and the larger sample space of input values comprises first input values that are associated with approximation output values stored in a dedicated lookup table and second input values that are associated with approximation output values determined by polynomial approximation and not stored in the dedicated lookup table.

* * * * *